Nov. 27, 1934. O. N. WISWELL Re. 19,387
HEAD FOR PUNCTURING CLOSURE DISKS
Original Filed March 2, 1931
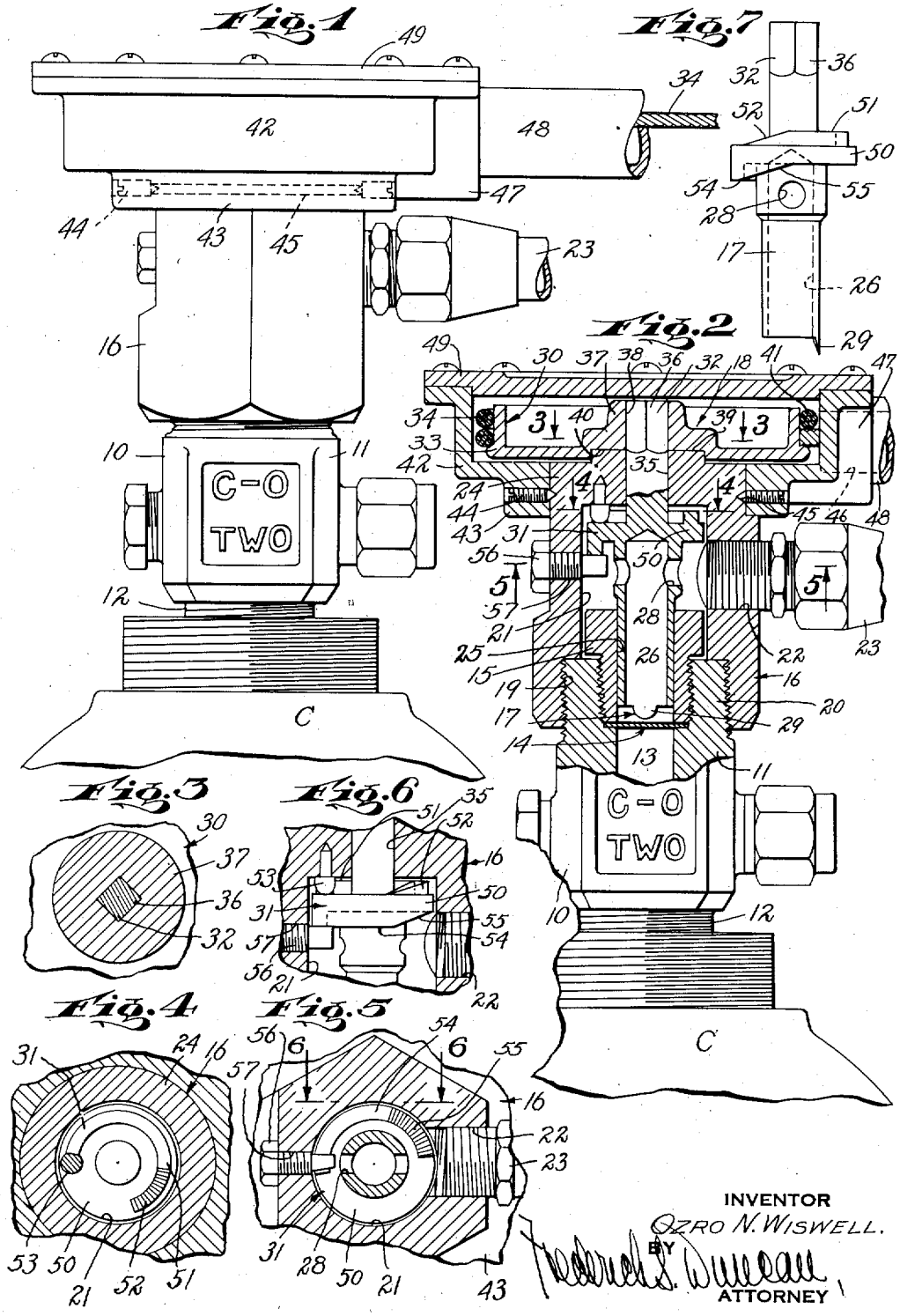
INVENTOR
OZRO N. WISWELL.
BY
Frederick S. Duncan
ATTORNEY Reissued Nov. 27, 1934

Re. 19,387

UNITED STATES PATENT OFFICE 19,387

HEAD FOR PUNCTURING CLOSURE DISKS

Ozro N. Wiswell, Los Angeles, Calif., assignor, by mesne assignments, to C-O-Two Fire Equipment Company, Newark, N. J., a corporation of Delaware Original No. 1,910,511, dated May 23, 1933, Serial No. 519,471, March 2, 1931. Application for reissue August 7, 1934, Serial No. 738,844

11 Claims. (Cl. 169—11)

This invention relates to fire extinguishing equipment, and relates more particularly to a device for puncturing the closure disk of a container holding a fire extinguishing medium under pressure.

In fire extinguishing systems employing carbon dioxide or like fire extinguishing agents or mediums, the medium is usually contained under pressure in steel cylinders or flasks. The discharge outlets of the fluid-containing cylinders are usually closed by penetrable closure disks adapted to be punctured or cut out to release the fluid. Discharge heads of various types are provided on the containers for puncturing the closure disks to release the fluid from the containers. One type of discharge head in general use involves a cutter for penetrating the penetrable closure disk and means for operating the cutter which includes a stem projecting vertically upward from the head and operable upon being depressed to actuate the cutter. The type of discharge head referred to is usually comparatively long so that it projects a considerable distance from the top of the fluid container, and the container must be positioned so that the operating stem of the head is readily accessible for operation or depression. In certain situations it is sometimes desirable or necessary to position a container of the fire extinguishing medium adjacent or below a shelf, or the like, where there is insufficient space for a discharge head of the type referred to, or insufficient space to permit the ready actuation of the head.

Discharge heads for puncturing closure disks of fluid containers have been introduced that embody cutters operable by turning a screw-threaded stem. This screw-actuated type of discharge head must necessarily be comparatively large as the actuating stem has considerable longitudinal movement and must be packed about by packing glands, or the like. Further, the screw-actuating stem has a compound movement; that is, rotary and longitudinal movement, and the means for actuating the stem must, accordingly, be capable of a like movement.

It is a general object of the invention to provide a simple, compact, and effective device for puncturing the closure disk of a fluid container.

It is another object of the invention to provide a discharge head for puncturing a closure disk that may be embodied in a comparatively short structure to occupy a minimum amount of vertical space at the upper end of a fluid container and that may be actuated by a horizontal force.

It is another object of the invention to provide a discharge head of the character mentioned that includes a cutter that is operable by turning or partial rotation to make a circular cut of approximately 270° in the closure disk so that the central portion of the disk may be bent or hinged back by the discharge of the fluid to permit the free, unrestricted outward flow of fluid.

Another object of the invention is to provide a discharge head of the character mentioned in which the cutter is caused to puncture the disk by cam means during its rotation and moves inwardly to puncture the disk while turning and continues in its rotary movement to make the circular cutter.

It is another object of the invention to provide a discharge head of the character mentioned that is constructed so that the operating force may be applied in one direction, for example, in a horizontal direction, and without compound movement. The device is such that it may be set to have the force applied in any one of a plurality of different horizontal directions.

A further object of the invention is to provide a discharge head for puncturing a closure disk that is simple and inexpensive of manufacture and that is constructed so as to be readily dissembled for inspection, etc.

Other objects and features of my invention will be best and more fully understood from the following detailed description of a typical form and application of the invention, throughout which description reference is had to the accompanying drawing, in which:

Fig. 1 is a side elevation of the head provided by the present invention, showing it arranged on the valve of a typical fluid-containing cylinder;

Fig. 2 is a vertical detailed sectional view of the head, illustrating the parts in the normal or unactuated position;

Figs. 3, 4 and 5 are transverse detailed sectional views taken substantially as indicated by lines 3—3, 4—4, and 5—5 on Fig. 2 respectively;

Fig. 6 is a vertical sectional view of a portion of the device showing the cam means in elevation; and Fig. 7 is a side elevation of the cutter element embodied in the device.

The present invention is adapted to be embodied in forms for puncturing the closure disks of the various types of fluid containers and the valves or fittings of various types of containers. In the drawing, I have illustrated the head mounted on a typical cylinder filling and discharge fitting or valve 10 arranged on the upper end of a cylinder C of the class commonly employed for containing carbon dioxide, and the like. It is to be understood that the invention is not to be taken as limited or restricted to the particular form or application about to be described, but that it is to be taken as including any features or modifications that may fall within the scope of the claims.

The cylinder valve 10 illustrated in the drawing is intended to facilitate the filling and discharging of the cylinder C and the connection of the discharge head with the cylinder. The particular type of cylinder valve illustrated includes a body 11 having a stem 12 on its lower end threaded into the opening in the upper end of the cylinder C. A central vertical opening 13 is provided in the valve body 11 to discharge fluid from the cylinder. The opening 13 is closed by a penetrable closure disk 14. The closure disk 14 is held in the closing position across the opening 13 by a tubular nut 15 screw-threaded into the upper end of the opening. The cylinder valve 10 includes various other parts common to devices of this general character.

The fluid releasing device or discharge head provided by the present invention includes, generally, a body 16, a cutter 17 in the body for perforating the closure disk 14, and means 18 for operating the cutter.

The body 16 of the head is adapted to be detachably mounted on the body 11 of the cylinder valve. The body 16 may be an integral member having a screw-threaded socket 19 in its lower end for receiving a screw-threaded projection 20 on the upper end of the cylinder valve. In accordance with the invention, the body 16 of the head is chambered, being provided with a central vertical opening or chamber 21 for housing the cutter 17 and various other parts of the device. The upper projecting end of the tubular nut 15 is disposed within the lower end of the chamber 21. The upper end of the chamber 21 is closed, as illustrated in the drawing. An opening 22 is provided in the walls of the body 16 to communicate with the chamber 21. The opening 22 is adapted to receive the end of a fluid discharge conduit 23. The lower end portion of the body 16 may be polygonal, while the upper end 24 of the body is preferably round.

The cutter 17 is arranged within the body 16 and is provided to cut or perforate the closure disk 14 to release fluid from the cylinder C. In the particular form of the invention illustrated in the drawing, the cutter 17 is tubular and adapted to pass fluid upwardly from the opening 13 into the chamber 21. The cutter 17 is of round cross section and slidably and rotatably fits the opening 25 in the nut 15. The opening 26 in the cutter 17 extends upwardly from the lower end of the cutter and terminates at a point within the chamber 21. Lateral ports 28 are provided in the cutter 17 to discharge fluid from the upper end of the opening 26 into the chamber 21. A knife point or cutting part 29 is provided on the lower end of the cutter 17 to cut the closure disk 14. The cutting part 29 is designed to first perforate the closure disk and then make a circular cut in the disk during rotary or turning movement of the cutter. The cutting part 29 projects downwardly from the lower end of the cutter at its periphery to make a circular cut of maximum diameter in the disk. In the particular case illustrated in the drawing, the cutter part 29 is substantially semi-circular in side elevation. The edges of the cutting part 29 are sharpened and its inner side may be inclined downwardly and outwardly to provide it with a pointed lower end. The cutter 17 is normally held in a position where the cutting part 29 is spaced above the closure disk 14.

The means 18 for actuating the cutter 17 is operable to turn or partially rotate the cutter and cause downward or inward movement of the cutter during its rotation to force the cutting part 29 through the closure disk to make a circular cut therein. The means 18 includes means 30 for turning the cutter a limited extent, and means 31 for moving the cutter downwardly during its rotation to force the cutting part 29 through the closure disk 14.

In accordance with the broader aspects of the invention, the means for turning or rotating the cutter 17 may be varied considerably in character. In the particular embodiment of the invention illustrated in the drawing, the means 30 for turning or partially rotating the cutter 17 may be either manually or mechanically actuated and is such that it may be controlled or operated from a point remote from the discharge head. The means 30 includes, generally, an extension or stem 32 on the upper end of the cutter 17, a drum 33 connected with the stem 32, and a cable 34 wound on the drum 33. The stem 32 is in the nature of an extension on the upper end of the cutter 17 and may be integral with the cutter. The stem 32 extends through a vertical opening 35 in the body 16 to project from the upper end thereof. The portion 36 of the stem projecting from the body 16 is of polygonal cross section, for example, of square cross section, while the portion of the stem in the opening 35 is round to slidably and rotatably fit the opening.

The drum 33 is provided to carry the actuating cable 34 and is connected with the stem 32. The drum 33 may be provided with a central boss 37 having a polygonal opening 38 to slidably carry and cooperate with the polygonal portion 36 of the stem. A bearing projection 39 may be provided on the upper end of the body 16 to fit a socket 40 in the lower side of the boss 37 to rotatably support the drum 33. An upwardly projecting axial flange 41 is provided at the periphery of the drum to carry the cable 34.

Any suitable form of flexible line or cable may be employed in connection with the drum 33. In the drawing I have illustrated a stranded cable 34 wound on the flange 41 of the drum. The cable 34 may have several turns on the flange 41 and may have its end attached to the drum 33 in any suitable manner. The cable 34 may be made sufficiently long to extend any desired distance from the discharge head.

In the preferred form of the invention, a housing is provided to cover or encase the drum 33. The drum-enclosing housing may include a body part 42 surrounding the periphery of the drum and having a downwardly projecting flange 43 surrounding the upper portion 24 of the body. The housing part 42 may be removably and adjustably attached to the body by set screws 44 having pointed inner ends extending into an annular groove 45 in the round portion 24 of the body. A tangential opening 46 is provided in the housing part 42 to pass the cable 34 from the drum. A suitable guiding boss 47 may be provided around the outer end of the opening 46. A tubing or conduit 48 may be provided around the outer end of the opening 46. A tubing or conduit 48 may be provided to extend outwardly from the boss 47 for encasing and guiding the cable 34. It will be apparent that the cable 34 may be made to pass in any desired direction from the drum 33 by loosening the screws 44 and turning the housing part 42 to the desired rotative position. A cover plate 49 may be provided to close the upper end of the housing part 42.

The means 31 is in the nature of a cam means and is provided to cause a limited downward or inward movement of the cutter 17 upon its being turned or partially rotated. The cam means 31 includes parts on the cutter 17 and the body 16 which have cooperating camming action to cause downward movement of the cutter 17 during its rotation. In the particular form of invention illustrated in the drawing, the cam means 31 is within the chamber 21 and includes an annular radial flange 50 on the cutter 17. The upper side of the flange 50 is spaced below the upper wall of the chamber 21. A curved cam ridge 51 is provided on the upper side of the flange 50. The ridge 51 is curved concentrically about the axis of rotation of the cutter 17 and may extend approximately 240° around the flange. One end of the ridge 51 may terminate in an abrupt or axial shoulder, while the other end of the ridge is in the form of a cam face 52 which is gradually inclined downward to join the upper side of the flange 50.

The part on the body 16 for cooperating with the cam ridge 51 may be in the nature of a pin 53 having a rounded head projecting downwardly from the upper wall of the chamber 21. The rounded lower end of the pin 53 is adapted to cooperate with the upper side of the cam ridge 51 and the upper side of the flange 50. When the parts are in the normal position, the pin 53 engages the upper side of the flange 50 at a point spaced from the cam face 52. Upon rotation or turning of the cutter 17 in the direction for its operation, the cam face 52 is brought into engagement with the pin 53 so that the cutter 17 is forced downwardly. Continued turning of the cutter causes the upper side of the cam ridge to cooperate with the pin 53. Upon the cam face 52 cooperating with the pin 53, the cutting part 29 is forced downwardly through the closure disk 14 and the cooperation between the pin 53 and the upper side of the ridge 51 maintains the cutting part 29 in its down position where it makes a circular cut in the closure disk.

The invention provides means for normally holding the cutter 17 in a position where the flange 50 is in co-operative engagement with the pin 53 and where the cutting part 29 is spaced above the closed disk 14. A cam projection or ridge 54 is provided in the lower side of the flange 50. The cam ridge 54 may be similar to the ridge 51 and may have an inclined end or cam face 55 at one end. The other end of the ridge 54 may be substantially radial. The opposite ends of the cam ridge 54 may be in axial alignment with the opposite ends of the ridge 51 so that the cam faces 52 and 55 are parallel. A bolt or screw 56 may be threaded through an opening 57 in the body 16 to have its inner end project into the chamber 21. The projecting inner end of the screw 56 is intended to cooperate with the lower side of the flange 50 and cam ridge 54. The cam ridges 51 and 54 are related so that the screw 56 engages the upper side of the ridge 54 at a point adjacent its abrupt end, while the pin 53 engages the upper side of the flange 50 at a point spaced from the cam face 52 and adjacent the abrupt end of the ridge 51. Upon turning of the cutter 17, caused by unwinding of the cable 34 from the drum 30, the cutter is turned for approximately 120°, at which time the pin 53 and the screw 56 simultaneously engage the cam faces 52 and 53 so that the cutter is forced downwardly. Further turning of the cutter does not cause its longitudinal movement, as the pin 53 rides over the flat upper end of the cam face 51. Turning of the cutter is limited by the engagement of the axial end of the cam ridge 54 with the screw 56. The cam means 31 operates to give the cutter limited downward movement during its turning and to limit its turning motion.

It is to be understood that the location and character of the cam means for moving the cutter 17 downwardly to cut the closure disk may be varied considerably without departing from the broader features of the invention. It is readily apparent that the cam means may be embodied in the construction at a point exterior of the chamber 21. Further, the cam parts proper might well be provided on the body 16, or other stationary part, to be cooperated with by parts on the cutter assembly. In view of these obvious variations in the means for moving the cutter downward, the invention is not to be considered as restricted to the specific cam means 31 described above.

It is believed that the utility and practicability of the discharge head provided by the present invention will be readily apparent from the foregoing detailed description. The parts are normally positioned as illustrated throughout the drawing with the cam pin 53 retained in engagement with the upper side of the flange 50 by the screw 56 engaging the lower side of the cam ridge 54. Upon the cable 34 being actuated or unwound from the drum 30, the cutter 17 is turned in a direction to bring the cam face 32 into engagement with the pin 53 and the screw 56 into engagement with the cam face 55. During this preliminary movement of the cutter 17, the cutting part 29 remains spaced above the sealing disk 14. Engagement of the cam face 52 with the pin 53 causes the cutter to be abruptly or rapidly shifted downwardly so that the cutting part 29 is forced through the sealing disk 14. During further turning of the cutter, the upper end of the cam ridge 51 rides along or cooperates with the pin 53 so that the cutting part 29 is maintained in its down position to make a circular cut in the closure disk. Turning of the cutter 17 is stopped or limited by the straight end of the lower cam ridge 53 which comes into engagement with the screw 56 to prevent the central part of the disk 14 from being completely cut out. Upon the closure disk 14 being cut by the cutting part 29 in the manner described above, the fluid under pressure contained within the cylinder C forces or bends the central portion of the disk 14 outwardly so that it hinges between the opposite ends of the cut made by the part 29. This central portion of the closure disk is forced outwardly by the fluid pressure to lie against the walls of the opening 26 so that the fluid may freely discharge outwardly into the chamber 21 and discharge conduit 23.

It is to be noted that during the actuation of the device the cutter 17 moves downwardly relative to the drum 33 and that there is no longitudinal or vertical movement of the drum. The head may be quickly dissembled for inspection as the body 16 may be removed from the housing 64 by loosening the set screws 44. The stem 32 is free to slide downwardly out of the opening 38 upon the body 16 being removed. The body 16 may be easily removed from the cylinder valve by unthreading it from the threaded projection 20. The housing part 42 may be set in any desired rotative position to permit the cable 34 to extend tangentially from the drum 33 in any desired direction. The cam faces 52 and 55 may be formed so that the cutting part 29 is rapidly forced downwardly through the closure disk during operation of the head. The assembly is particularly compact and occupies but little vertical space at the upper end of the container. The cable 34 may be actuated in any suitable manner, either manually or mechanically, and the head is adapted for use in systems involving a plurality of interconnected units or in an installation involving a single fluid container.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. A releasing device for use in connection with a fluid container having an opening and a closure for the opening which comprises a cutter operable to cut the closure, and means for operating the cutter including, means operable from a point remote from the device for turning the cutter, and cam means for shifting the cutter longitudinally a limited distance to puncture the closure and for holding it against further longitudinal movement during turning.

2. A releasing device for use in connection with a fluid container having an opening and a closure for the opening which includes, a body adapted to be applied to the container, a cutter in the body for puncturing the closure, and means for operating the cutter including means at the exterior of the body for turning the cutter, and cam means in the body for moving the cutter longitudinally during its turning to puncture the closure and for preventing continued longitudinal movement of the cutter after the closure is punctured during continued turning.

3. A releasing device for use in connection with a fluid container having an opening and a closure for the opening which comprises a cutter operable to cut the closure, means for turning the cutter and for moving the cutter longitudinally to puncture the closure during a portion of its turning movement and for continuing turning of the cutter after puncturing of the closure without further longitudinal movement of the cutter, and means for limiting the turning movement of the cutter so that it makes a circular cut in the closure of less than 360°.

4. A releasing device for use in connection with a fluid container having an opening and a closure for the opening which includes two elements, one a stationary body, the other a movable cutter for puncturing and cutting the closure, and means for operating the cutter including means for turning the cutter, means for moving the cutter longitudinally during the first portion only of its turning to cut into the closure, the last mentioned means including a cam part on one element for cooperating with a part on the other element and means for limiting the turning movement of the cutter to cut less than 360° around the closure.

5. A releasing device for use in connection with a fluid container having an opening and a closure for the opening which comprises a cutter operable to cut the closure, and means for operating the cutter including means for turning the cutter, and means for moving the cutter longitudinally into engagement with the closure during a portion of its motion to make a circular cut in the closure, there being a sliding connection between the means for turning the cutter and the cutter.

6. A releasing device for use in connection with a fluid container having an opening and a closure for the opening which comprises a cutter operable to cut the closure, and means for operating the cutter including means for turning the cutter, moving the cutter longitudinally to pierce the closure during its turning, and for continuing turning of the cutter without further longitudinal movement, comprising a drum mounted for rotation in a fixed plane and carrying an operating line, and an operating connection between the drum and cutter through which the cutter is turned from the drum and may shift longitudinally relative to the drum.

7. A device for releasing fluid from a container having an opening and a closure for the opening including a cutter, means for turning the cutter about its longitudinal axis, and cam means operated by turning the cutter to initially move the cutter longitudinally during a comparatively small part of the turning motion of the cutter to pierce the closure and to thereafter hold the cutter against further longitudinal movement.

8. A device for releasing fluid from a container having an opening and a closure for the opening which includes a body adapted to be applied to the container, the body having a chamber communicating with the opening of the container and a discharge opening for the chamber, a cutter in the body for puncturing the closure, and means for operating the cutter including a drum rotatable on the body for turning the cutter, a flexible line engaged around the drum and having one end extending to a point remote from the body, and means in the body for moving the cutter longitudinally during the initial portion of its turning movement to pierce the closure and for holding the cutter against longitudinal movement during the remainder of the turning movement.

9. A releasing device for use in connection with a fluid container having an opening and a closure for the opening which comprises a cutter operable to cut the closure, and means for advancing and turning the cutter to bring the cutter into engagement with the closure and make an arcuate cut in the closure, the cutting edge of the cutter subtending at an angle of considerably less than 360 degrees as measured along the cut, and a stop for limiting operation of the cutter after it has made a cut in the closure of more than 180° but substantially less than 360 degrees.

10. A releasing device for a fluid container having an opening and a closure for the opening, which comprises a cutter operable to cut a flap out of the closure, said cutter consisting of a tubular member formed at one end with a cutting edge of considerably less than 360 degrees in extent, means for advancing the cutter longitudinally into cutting engagement with the closure and for turning the cutter during such engagement to make an arcuate cut in the closure, and a stop limiting the turning of the cutter to limit the cut to less than 360 degrees in extent and leaving an uncut portion of a size sufficient to serve as a hinge for said flap.

11. A releasing device for a fluid container having an opening and a closure for the opening, which comprises a body adapted to be applied to the container, a cutter rotatable in the body to cut a flap out of the closure, said cutter consisting of a tubular member formed at one end with a cutting edge of considerably less than 360 degrees in extent, means for rotating the cutter to make an arcuate cut in the closure, cooperating means on the body and the cutter for causing the cutter to advance during turning movement thereof into cutting engagement with the closure, and a stop limiting the turning of the cutter to limit said cut to less than 360 degrees in extent and leaving an uncut portion of a size sufficient to serve as a hinge for said flap.

OZRO N. WISWELL.